UNITED STATES PATENT OFFICE 2,090,593

PROCESS FOR THE PREPARATION OF UREA DERIVATIVES

Ralph A. Jacobson, Wilmington, Del., assignor to E. I. du Pont de Nemours & Company, Wilmington, Del., a corporation of Delaware No Drawing. Application January 24, 1936, Serial No. 60,705

12 Claims. (Cl. 260—125)

This invention relates to urea derivatives, more particularly to acyl and aralkyl ureas, and to a process for the preparation thereof.

It is an object of this invention to provide a new and improved process for producing substituted urea derivatives. A further object is the provision of a new and improved process for the preparation of acyl ureas, that is, urea derivatives in which a hydrogen atom on one or both of the urea nitrogen atoms is replaced by an acyl radical. A still further object is the provision of a new and improved process for preparing aralkyl ureas, that is, urea derivatives in which a hydrogen atom on one or both of the urea nitrogen is replaced by an aralkyl group. An additional object is the preparation of diureides by a new and improved process. A more specific object is the provision of a new and improved process for the synthesis of urea derivatives of the higher fatty acids. Another object is the preparation of new and useful chemical compounds and compositions. Other objects will appear hereinafter.

In accomplishing these objects according to the present invention, substituted ureas are produced by reacting an alkali metal urea such as, for example, sodium urea, with an organic halide from the class consisting of acyl and aralkyl halides. The alkali metal urea may conveniently be obtained by reacting urea with a liquid ammonia solution of the alkali metal in accordance with methods described in my co-pending application Serial No. 15,425 filed April 9, 1935. The reaction between the alkali metal urea and the acyl or aralkyl halide may be effected by bringing these materials together at appropriate temperatures in the presence or absence of diluents or solvents, such as, for example, volatile organic solvents. The products may be isolated and purified in any suitable manner, for instance, as hereinafter described.

The process is preferably carried out by the direct reaction of the organic halide with sodium urea, the latter being added slowly to the organic halide in a liquid or fused state. Purification is preferably effected by dissolving the reaction product in a water-immiscible solvent, extracting with water, and then separating the solvent layer containing the dissolved substituted urea from the water layer. The substituted urea is usually recovered from the solution by evaporation of the solvent.

The invention will be further illustrated but is not limited by the following examples in which the quantities are stated in parts by weight.

EXAMPLE I

Oleyl urea

Fifty (50) parts of oleyl chloride (oleic acid chloride) were warmed gently on a hot plate, and 13.5 parts of sodium urea were added slowly. The reaction proceeded smoothly and, when once started, heating was discontinued. The soft pasty mass was allowed to cool, isobutyl alcohol added, and the mixture warmed to dissolve the oleyl urea formed. The alcohol solution was washed with water, cooled and allowed to stand at room temperature. Oleyl urea separated out. The yield of product melting at 150°–155° C. was 12 parts.

EXAMPLE II

Stearyl urea

This compound was synthesized and purified by the method described in Example I by mixing 27 parts of sodium urea with 100 parts of stearyl chloride (stearic acid chloride) and allowing the mixture to stand overnight at room temperature. Analysis of the product obtained showed it to contain 8.24% nitrogen, whereas the calculated nitrogen content of monostearyl urea is 8.64%.

EXAMPLE III

Benzoyl urea

Twenty (20) parts of sodium urea were suspended in 71.9 parts of ether, and 40 parts of benzoyl chloride were added slowly, with stirring. The product was washed with water, filtered, and then washed with ether. Fifteen (15) parts of product melting at 210°–212° C., and which was identified as benzoyl urea, were obtained.

EXAMPLE IV

Phthalyl ureide

Eight and two-tenths (8.2) parts of sodium urea were added slowly, with gentle warming, to 10.3 parts of phthalyl chloride, and 22 parts of benzene were then added to moderate the reaction. The benzene was evaporated, and the product crystallized from alcohol. The melting point of the material obtained was 240° C. This compound has the probable formula:

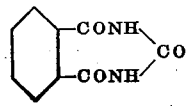

Analysis showed it to contain 57.1% carbon, 3.2% hydrogen and 14.7% nitrogen, whereas the theoretical proportions of carbon, hydrogen and nitrogen in a compound of the above formula are 56.8%, 3.2% and 14.7%, respectively.

EXAMPLE V

Benzyl urea

A suspension of sodium urea in liquid ammonia was first prepared by reacting 5.75 parts of sodium and 15 parts of urea in about 312 parts of liquid ammonia. To this mixture was added slowly 31.5 parts of benzyl chloride in about 62 parts of liquid ammonia. The mixture was allowed to stand overnight. The white solid that separated out was washed with ether, then with water, and the mixture filtered. The product was purified by recrystallization from toluene and gave white crystals melting at 142°–143° C. Analysis of the product obtained showed it to contain 18.24% nitrogen, whereas the theoretical value for benzyl urea is 18.66%.

EXAMPLE VI

Acetyl urea

Sixty-two and five-tenths (62.5) parts of acetyl chloride were dissolved in an equal weight of toluene, the solution refluxed, and then 82 parts of sodium urea added slowly in small portions. Upon completion of the addition of the sodium urea, the solution was allowed to cool, the sodium chloride filtered off, and the filtrate concentrated by evaporation until crystallization began. The product purified by crystallization from hot ethyl alcohol was identified as acetyl urea.

EXAMPLE VII

Dibenzoyl urea

To 10.4 parts of disodium urea, NaNHCONHNa (prepared by the action of two moles of sodium upon one mole of the urea in liquid ammonia), were added slowly 28 parts of benzoyl chloride. A vigorous reaction took place. When this reaction subsided, the product was crystallized from alcohol, and a white crystalline material melting at 204° C. was obtained. It was identified as dibenzoyl urea by a nitrogen analysis (calculated 10.44%; found 10.70%).

According to methods similar to those described in the examples, the reaction may be effected with any acyl or aralkyl halide. As examples of acyl halides that are particularly useful in the practice of the invention may be mentioned the halides of acids such as acetic, propionic, butyric, capric, caproic, decylic, undecylic, lauric, myristic, pentadecylic, palmitic, oleic, cerotic, abietic, phthalic, terephthalic, salicylic, mandelic, succinic, adipic, maleic, malonic, benzoic, phenyl acetic, toluic, naphthoic, and related acids. The process is also applicable to the preparation of mixtures of substituted ureas, for example, such mixtures as are obtainable by the reaction of sodium urea with the halides of fatty oil acid mixtures such as coconut oil acid chlorides or various fractions thereof, particularly the fractions in which lauric acid chloride preponderates. The latter coconut oil acid fraction is herein referred to as "Lorol acid chloride". Similarly, there may be used in the process sperm oil acid halides and the halides of those acid mixtures such as are obtainable by the oxidation of synthetic higher alcohol mixtures produced by the hydrogenation of carbon oxide. The latter type of acid mixture may be obtained, for example, by the oxidation of alcohol mixtures such as described in Lawson, U. S. Patent No. 2,015,077. The oxidation of these alcohol mixtures may be carried out as described by Reid, U. S. Patent No. 1,856,263, or by catalytic oxidation, in the vapor phase, of a mixture of oxygenated organic compounds obtained in the catalytic synthesis of methanol from carbon monoxide and hydrogen. The oxidation may be effected in the presence of of a suitable catalyst such as a manganese catalyst. The conversion of the free acids to the acid chlorides may be carried out by the usual method for converting carboxylic acids to the acid chlorides.

In general, the present process has given especially desirable results in the preparation of acyl ureas in which the acyl radical contains at least eight carbon atoms, and particularly those containing eight to eighteen carbon atoms, inclusive.

As further examples of aralkyl halides which may be employed in accordance with the invention may be mentioned tolyl chloride, benzyl fluoride, naphthyl chloride, 1:4-xylylene dichloride, trichlorobenzyl chloride, and related compounds. In general, the preferred aralkyl halides may be given the formula:

$$R(CH_2)_nX$$

where R is an aromatic radical (for instance, of the benzene, naphthalene or anthracene series), n is one or a number greater than one, and X is halogen.

Generally speaking, the organic halides employed in accordance with the invention may be chlorides, bromides, iodides or fluorides. The practical utility of the invention is especially evident in the case of the acyl and aralkyl chlorides.

The aromatic nuclei of the aralkyl halides and of the acyl halides of aromatic carboxylic acids may contain substituents such as, for example, halogen atoms, alkyl radicals (e. g., methyl, ethyl, propyl and higher homologues), and alkoxy radicals (e. g., methoxy, ethoxy, isopropoxy, n-butoxy, and higher homologues).

The proportions of the reacting materials may be varied according to the type of compound reacted upon and the product desired. Thus, in order to produce a ureide by reaction of a diacyl halide with sodium urea, approximately equimolecular proportions of the reacting materials may be employed. Likewise, monoacyl ureas are best secured by reacting monosodium urea with the monoacyl halide in approximately equimolecular proportions.

I have also found that certain aliphatic diureides (i. e., substituted ureas containing two —NHCONH₂ radicals) may be obtained by reacting an aliphatic diacyl halide containing more than three carbon atoms with at least two molecular proportions of sodium urea per mole of the aliphatic diacyl halide.

Instead of sodium urea, other alkali metal ureas such as, for instance, potassium urea, may be employed. As indicated in Example VII, the reaction may also be effected between polyalkali metal ureas, as for instance, disodium urea (NaNHCONHNa) and monoacyl halides or monoaralkyl halides; or between polyacyl halides and polyaralkyl halides and mono- or disodium urea.

The time and temperature of the reaction may be varied within relatively wide limits, but it is generally preferable to carry out the reaction at as low a temperature as practicable; for example, satisfactory results have ordinarily been obtained at temperatures within the range of —40° C. when liquid ammonia is used to 75° C. when an organic diluent such as benzene or toluene is used, but higher or lower temperatures may be used. Generally, the time and temperature of reaction will vary both with the method of preparation and the nature of the reacting ingredients.

While it is usually preferable to carry out the synthesis in the absence of a solvent, particularly with acyl and aralkyl halides which are normally liquid or which have relatively low melting points, in some cases it is desirable to carry out the reaction in the presence of an inert volatile organic solvent such as diethyl ether, petroleum ether, benzene, toluene, xylene and similar solvents. This latter method is especially useful in the treatment of high-melting acyl or aralkyl halides.

The products of this invention may be employed in the synthesis of resins of the urea-aldehyde type, which resins have important uses in the coating and plastics arts; the lower acyl ureas, for example, alone or in conjunction with urea, react readily with formaldehyde to form resinous bodies. The higher acyl ureas, such as stearyl urea, may be incorporated into a urea-aldehyde resin during or subsequent to its formation, and its water-resistance and flexibility are thereby increased. In general, the higher acyl ureas are useful for improving the water-resistance of synthetic resins or coating compositions containing them. In certain instances, the higher acyl ureas may be used directly as substitutes for natural waxes in the water-proofing of paper, wood and textiles.

The acyl and aralkyl ureas are also useful in the synthesis of rubber chemicals (e. g., accelerators, softeners, antioxidants), dispersing and wetting agents, flotation agents, parasiticides, and dyes. For example, the higher acyl ureas, upon sulfonation, are converted to valuable detergents.

The process of this invention is particularly advantageous in the production of acyl and aralkyl derivatives of urea which cannot be readily prepared by procedures known heretofore. The present invention is particularly useful in the synthesis of acyl ureas in which the acyl group is that of a higher fatty acid, e. g., lauric acid, stearic acid, and oleic acid. The process of this invention offers a simple way for synthesizing ureides and diureides, by reaction of sodium urea with acyl halides of polybasic acids.

As many apparently widely different embodiments of this invention may be made without departing from the spirit and scope thereof, it is to be understood that I do not limit myself to the specific embodiments thereof except as defined in the appended claims.

I claim:

1. In a process of producing substituted ureas, the step which comprises reacting an alkali metal urea with an acyl halide.

2. In a process of producing acyl ureas, the step which comprises reacting sodium urea with an acyl halide.

3. In a process of producing acyl ureas, the step which comprises reacting sodium urea with an aromatic acyl halide.

4. In a process of producing acyl ureas, the step which comprises reacting sodium urea with an acyl chloride.

5. In a process of producing acyl ureas, the step which comprises reacting sodium urea with the chloride of a monocarboxylic acid.

6. In a process of producing acyl ureas, the step which comprises reacting sodium urea with the chloride of a fatty acid.

7. In a process of producing acyl ureas, the step which comprises reacting sodium urea with an acyl halide in the presence of an inert solvent.

8. In a process of producing a ureide, the step which comprises reacting sodium urea with a compound having a plurality of acid halide groups.

9. In a process of producing acyl ureas, the step which comprises reacting sodium urea with the chloride of a dicarboxylic acid.

10. In a process of producing acyl ureas, the step which comprises reacting sodium urea with phthalyl chloride.

11. In a process of producing a long-chain acyl urea, the step which comprises reacting sodium urea with a normal straight chain acyl chloride containing from eight to eighteen carbon atoms in the acyl radical.

12. In a process of producing acyl ureas, the step which comprises reacting sodium urea with stearic acid chloride.

RALPH A. JACOBSON.